US008866955B2

(12) United States Patent
Kawarada

(10) Patent No.: US 8,866,955 B2
(45) Date of Patent: Oct. 21, 2014

(54) FOCUS DETECTION APPARATUS, METHOD FOR CONTROLLING THE SAME, AND IMAGE CAPTURING APPARATUS HAVING A FOCUS DETECTION APPARATUS

(75) Inventor: Masahiro Kawarada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 13/417,766

(22) Filed: Mar. 12, 2012

(65) Prior Publication Data
US 2012/0242886 A1    Sep. 27, 2012

(30) Foreign Application Priority Data

Mar. 24, 2011  (JP) ................................ 2011-066556

(51) Int. Cl.
*G03B 13/00* (2006.01)
*H04N 5/232* (2006.01)
*G02B 7/36* (2006.01)
*G03B 13/36* (2006.01)

(52) U.S. Cl.
CPC ............ *G02B 7/365* (2013.01); *H04N 5/23212* (2013.01); *G03B 13/36* (2013.01)
USPC ............ 348/349; 348/345; 348/353; 382/255

(58) Field of Classification Search
USPC ................... 348/345, 349, 353, 354; 382/255
See application file for complete search history.

(56) References Cited

U.S. PATENT DOCUMENTS

2008/0198257 A1*  8/2008  Morimoto ..................... 348/345

FOREIGN PATENT DOCUMENTS

CN       1811516 A        8/2006
JP       2006-146031      6/2006

OTHER PUBLICATIONS

Aug. 5, 2014 Chinese Office Action, with an English Translation, that issued in Chinese Patent Application No. 201210082812.6.

* cited by examiner

*Primary Examiner* — Paul Berardesca
(74) *Attorney, Agent, or Firm* — Cowan, Liebowitz & Latman, P.C.

(57) ABSTRACT

A focal position is searched for by contrast evaluation method, the focus lens is stopped once it is detected that the focus lens has passed the focal position, and the defocus amount at the stopping position is found. The defocus amount corresponding to the difference between the focal position and the stopping position is subtracted from this defocus amount to compute a correction value for the defocus amount. Consequently, a correction value for the focus detection result by phase-difference detection method can be obtained accurately in a focus detection apparatus capable of automatic focus detection by phase-difference detection method and contrast evaluation method, as well as a method for controlling this apparatus.

12 Claims, 5 Drawing Sheets

FOCUS DETECTION APPARATUS, METHOD FOR CONTROLLING THE SAME, AND IMAGE CAPTURING APPARATUS HAVING A FOCUS DETECTION APPARATUS

BACKGROUND OF THE INVENTION

1. Field of the Invention

The present invention relates to a focus detection apparatus and to a method for controlling the same, and more particularly relates to a focus detection apparatus capable of automatic focus detection by a plurality of methods. The present invention also relates to an image capturing apparatus having a focus detection apparatus.

2. Description of the Related Art

There are conventional image capturing apparatuses capable of a plurality of types of auto-focus detection, such as auto-focus detection by phase-difference detection method (phase difference AF) and auto-focus detection by contrast evaluation method (contrast AF).

Japanese Patent Laid-Open No. 2006-146031 discloses a focus detection apparatus with which the difference between the detection result by phase difference AF and the detection result by contrast AF is stored as a correction value, and the detection result by phase difference AF is corrected with this correction value. In phase difference AF, the computation of the defocus amount is premised on a phase-difference detection sensor being attached at an assumed position, so error may occur in the detection result if the attachment accuracy should deviate from the ideal value due to manufacturing error, temporal change, or the like. With Japanese Patent Laid-Open No. 2006-146031, this error is corrected by utilizing a detection result by contrast AF using an image signal, which improves the detection accuracy of phase difference AF.

With the focus detection apparatus disclosed in Japanese Patent Laid-Open No. 2006-146031, phase difference AF is executed by moving the focus lens to the focal position detected by contrast AF (the focus lens position at which the contrast evaluation value reaches its maximum (peak position)). The difference between the focus lens position corresponding to the defocus amount detected at the peak position, and the peak position detected by contrast AF is obtained as a correction value.

However, with this method for obtaining a correction value, since the focus lens is driven a number of times after the detection of the peak position, there is the risk that driving tolerance will accumulate every time the lens is driven, and the accuracy of the correction value will suffer. This will be described in greater detail through reference to FIG. 5.

FIG. 5 shows an example of the relation between contrast AF operation and the contrast evaluation value. A contrast evaluation value drive 503 indicates the drive operation of the focus lens for searching for the peak value of the contrast evaluation value. The contrast evaluation value drive 503 is commenced at a focus lens position 500, and the focus lens is driven in a specific direction while a contrast evaluation value is found for every time the lens position changes by a specific amount. In FIG. 5, the focus lens position at which the contrast evaluation value was found is indicated by a broken line. A stopping position 507 is the position at which the drive of the focus lens is stopped, assuming that the peak is detected with the focus lens positions 504 to 506. Also, a focus drive 508 is an operation of driving the focus lens in the opposite direction from the stopping position 507 to a peak position 501.

That is, the focus lens has already separated from the peak position 501 at the point when it is determined at a focus lens position 506 that the peak position of the contrast evaluation value has been passed. In Japanese Patent Laid-Open No. 2006-146031, the focus drive 508 is performed in order to obtain a phase difference AF detection result at the peak position 501. However, the focus lens position after the focus drive 508 has the width of a driving tolerance 509 with respect to the peak position 501. Therefore, the detection result by phase difference AF for obtaining a correction value is a result with respect to the value of the peak position 501 within the range of the driving tolerance 509. However, the correction value is computed using this as a detection result with respect to the peak position 501, so the decrease in the accuracy of the correction value is particularly great when using an image capturing lens with a large driving tolerance for the focus lens, and a satisfactory correction may not be obtained.

SUMMARY OF THE INVENTION

The present invention was conceived in light of these problems encountered with prior art. The present invention provides a focus detection apparatus capable of auto-focus detection by phase-difference detection method and by contrast evaluation method, and a method for controlling this apparatus in which a correction value for a focus detection result by phase-difference detection method can be obtained accurately.

According to an aspect of the present invention, there is provided a focus detection apparatus, comprising: focus detection unit which detects a defocus amount of an image capturing lens by phase-difference detection method; drive control unit which controls drive of a focus lens of the image capturing lens; evaluation value obtaining unit which obtains a contrast evaluation value of a captured image; and control unit, wherein the control unit: moves the focus lens in one direction, using the drive control unit, determines whether or not the position of the focus lens has passed a peak position at which the contrast evaluation value is maximum, based on the contrast evaluation values obtained by the evaluation value obtaining unit for captured images captured at different positions of the focus lens, stops the movement of the focus lens and obtains the focus lens stopping position if it is determined that the position of the focus lens has passed the peak position, decides the peak position using the contrast evaluation value obtained by the evaluation value obtaining unit and the corresponding position of the focus lens, detects the defocus amount, using the focus detection unit, without moving the focus lens from the stopping position, and computes a correction value for the defocus amount detected by the focus detection unit, by subtracting a defocus amount corresponding to a difference between the decided peak position and the stopping position from the defocus amount detected by the focus detection unit.

According to another aspect of the present invention, there is provided a method for controlling a focus detection apparatus comprising: focus detection unit which detects a defocus amount of an image capturing lens by phase-difference detection method; drive control unit which controls drive of a focus lens of the image capturing lens; and evaluation value obtaining unit which obtains a contrast evaluation value of a captured image, the method comprising the steps of: moving the focus lens in one direction by the drive control unit, determining whether or not the position of the focus lens has passed a peak position at which the contrast evaluation value is maximum, based on the contrast evaluation values obtained by the evaluation value obtaining unit for captured images captured at different positions of the focus lens, stopping the movement of the focus lens and obtains the focus lens stopping position if it is determined that the position of the focus lens has passed the peak position, deciding the peak position using the contrast evaluation value obtained by the evaluation value obtaining unit and the corresponding position of the focus lens, detecting the defocus amount, by the focus detection unit, without moving the focus lens from the stopping position, and computing a correction value for the defocus amount detected by the focus detection unit, by subtracting a defocus amount corresponding to a difference between the decided peak position and the stopping position from the defocus amount detected by the focus detection unit.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment
Configuration of Digital Camera

Figure 1:
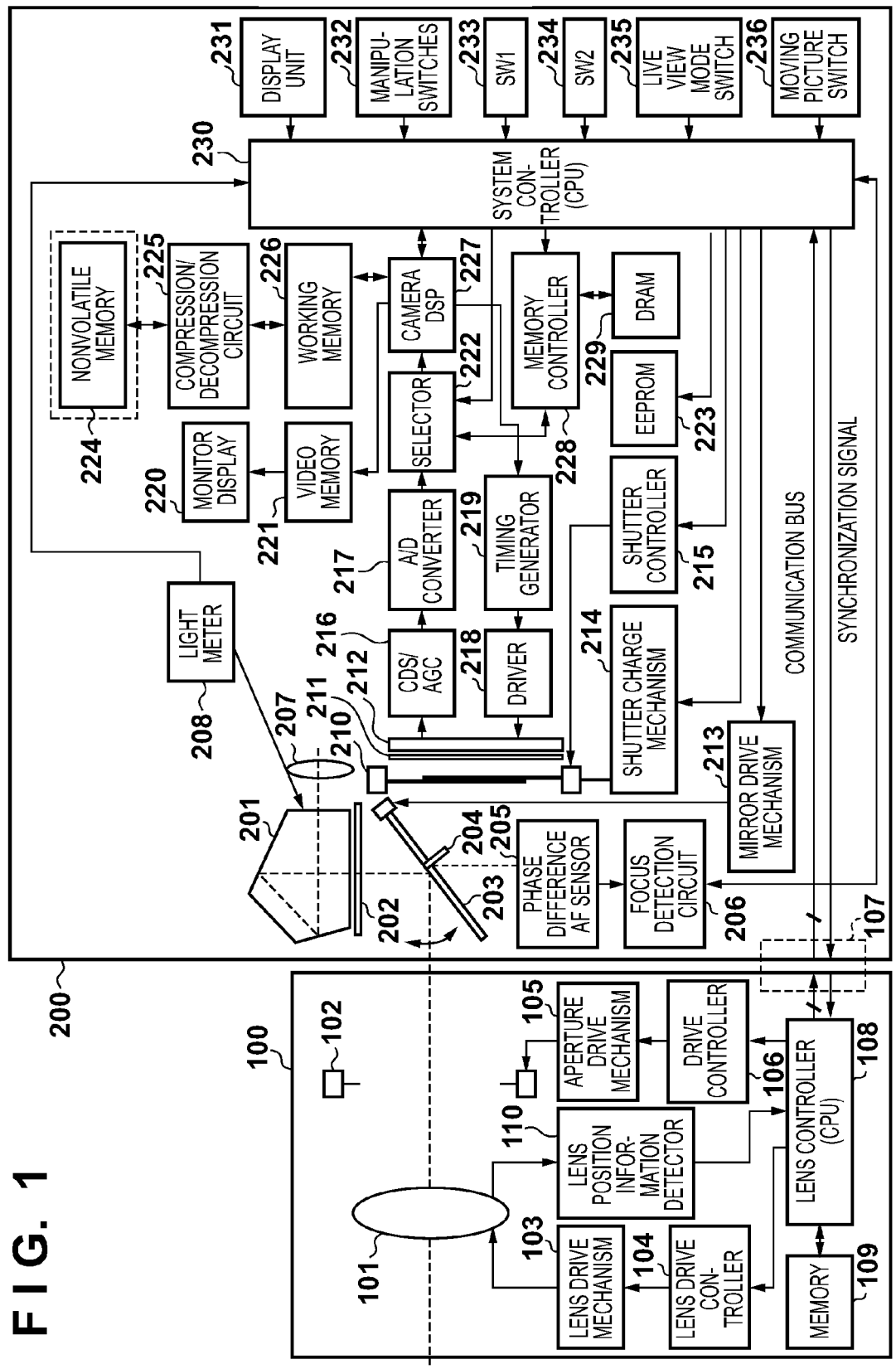
FIG. 1 is a block diagram of an example of the configuration of a digital single reflex camera, as an example of an image capturing apparatus according to an embodiment of the present invention.

FIG. 1 is a block diagram of an example of the configuration of a digital still camera (hereinafter referred to simply as a camera), as an example of an image capturing apparatus according to an embodiment of the present invention. The camera 200 in this embodiment is a single lens reflex camera with an interchangeable lens, but the present invention can be applied to any camera capable of auto-focus detection by phase-difference detection method and contrast evaluation method.

An image capturing lens 100 is removably attached to the camera 200 via a lens mounting mechanism of a mount (not shown). An electrical contact unit 107 is provided to the mount. This electrical contact unit 107 is provided with a terminal for a communications bus line including a communications clock line, a data transfer line, a data reception line, or the like, and a terminal for a synchronization signal line for sending the timing for charge accumulation of image signals from the camera side to the lens side.

A system controller 230 of the camera 200 and a lens controller 108 of the image capturing lens 100 can communicate through the electrical contact unit 107. For instance, the system controller 230 controls the drive of an aperture 102 for adjusting the amount of incident light, and a focus lens 101 inside the image capturing lens 100 by communicating with the lens controller 108. FIG. 1 shows only the focus lens 101 out of the lenses that constitute the image capturing lens 100, but a zoom lens and a fixed lens are provided in addition to the image capturing lens 100.

Light from a subject (not shown) is guided through the plurality of lenses (including the focus lens 101) and the aperture 102 inside the image capturing lens 100 to a quick-return mirror 203 inside the camera 200. The quick-return mirror 203 is able to move between a first position (shown) at which light from the subject is guided to a viewfinder optical system above, and a second position where it is retracted outside of the image capturing optical path, as a result of up-down drive by a mirror drive mechanism 213.

The middle part of the quick-return mirror 203 is a half-mirror, and when the quick-return mirror 203 is in its down state (first position), part of the light from the subject passes through the half-mirror portion. The light that has passed through the half-mirror portion is reflected by a sub-mirror 204 provided on the rear face side of the quick-return mirror 203, and guided to a phase difference AF sensor 205.

The phase difference AF sensor 205, along with a focus detection circuit 206, constitutes an auto-focus detection unit that makes use of the phase-difference detection method (phase difference AF unit). The phase difference AF sensor 205 is made up of a pair of pupil division optical systems and a line sensor pair group, and each of the line sensor pairs is provided at a position corresponding to a focus detection region.

Figure 2:
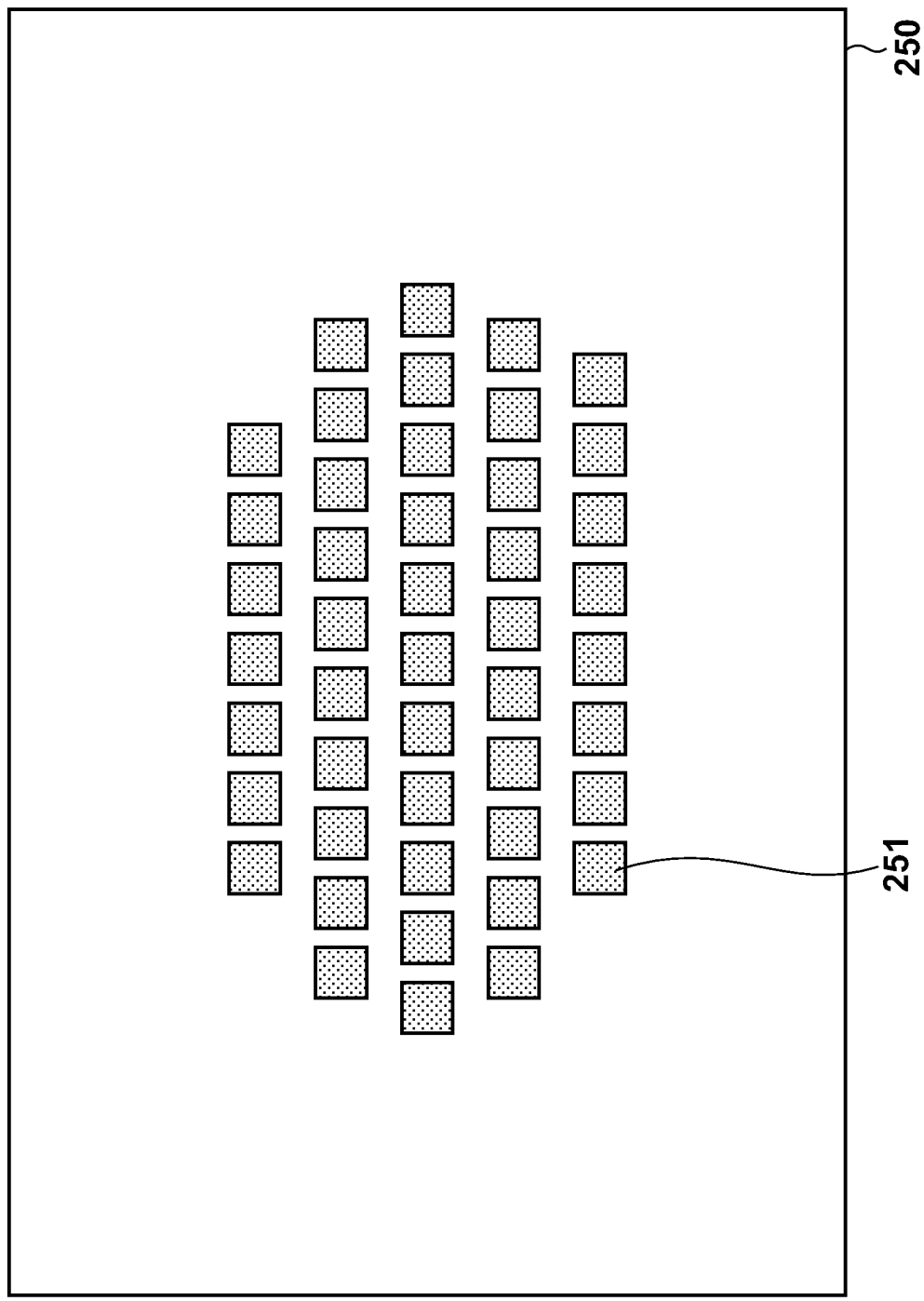
FIG. 2 is a schematic diagram illustrating an example of the layout of a focus detection region.

FIG. 2 shows an example in which 45 focus detection regions 251 are disposed on a two-dimensional image capture plane 250. In this case, 45 pairs of line sensors each corresponding to one of the 45 focus detection regions are provided to the phase difference AF sensor 205. The image signals detected by the 45 pairs of line sensors are outputted to the focus detection circuit 206. The charge accumulation time of the line sensors is also outputted to the focus detection circuit 206.

The charge accumulation time of the line sensors here is the clock time in the middle of the period from the start to the end of charge accumulation of the line sensors, and is the time indicating the median point of the charge accumulation timing. The focus detection circuit 206 performs known phase difference detection based on correlation from the inputted image signals of the line sensors, and computes the amount of deviation (the defocus amount) between the focal position of the subject and the current position of the focus lens 101. The defocus amount is computed for each of the focus detection regions. There are many different methods for using this value in one way or another to decide a single, final defocus amount, but this will not be described here because it is not directly related to the present invention. Once the defocus amount is decided, the focus detection circuit 206 converts it into the required drive amount of the focus lens 101 by a predetermined corresponding relation. The required drive amount thus obtained is sent through the system controller 230 to the lens controller 108, and the lens controller 108 controls the focal position of the focus lens 101 on the basis of the required drive amount.

Meanwhile, light reflected upward by the quick-return mirror 203 in the down state goes through a viewfinder optical system configured from a viewfinder screen 202 that lies in the focal plane, a pentaprism 201, and an eyepiece lens 207.

Photometry is then performed for every segment region obtained by further dividing up the region corresponding to the two-dimensional image capture plane of the light by a photometer 209 disposed so as to obliquely observe the light beam bent by the pentaprism 201. The photometry result for each segment region is outputted from the photometer 209 to the system controller 230.

When the quick-return mirror 203 moves to the up state during image capture, the light from the image capturing lens 100 goes from an opening in a focal plane shutter 210 (a mechanical shutter), through an optical filter 211, and to an image sensor 212. The optical filter 211 has a function of cutting out infrared rays and guiding visible light rays to the image sensor 212, and also functions as an optical low-pass filter.

The focal plane shutter 210 has a first curtain and a second curtain, and controls transmission and blocking of light from the image capturing lens 100.

The camera 200 has the system controller 230, which handles overall control of the system. The system controller 230 is made up of a CPU, MPU, etc., controls the operation of the various circuits in the camera 200, and also controls the operation of the image capturing lens 100 via the lens controller 108 by communication through the electrical contact unit 107.

The lens controller 108 is similar to the system controller 230 in that it is made up of a CPU, MPU, etc., and controls the operation of the various circuits in the image capturing lens 100.

In communication between the system controller 230 and the lens controller 108, commands to drive the focus lens 101 in the image capturing lens 100, stop commands, drive amounts, and the required drive speed are sent from the system controller 230. Furthermore, the drive amount of the aperture 102, the drive speed, and requests to send various data on the lens side are sent from the system controller 230.

In focus drive, the system controller 230 sends the lens controller 108 instructions about the lens drive direction, drive amount, and drive speed.

Upon receiving a lens drive command from the system controller 230, the lens controller 108 controls a lens drive mechanism 103 via a lens drive controller 104. The lens drive mechanism 103 has a stepping motor as its drive source, and drives the focus lens 101 along the optical axis.

Upon receiving an aperture control command from the system controller 230, the lens controller 108 controls an aperture drive mechanism 105, which drives the aperture 102, via an aperture drive controller 106, and controls the aperture 102 according to the received drive amount.

Also, the system controller 230 is connected to a shutter controller 215 and the photometer 209. The shutter controller 215 controls the travel drive of the first curtain and second curtain of the focal plane shutter 210 according to signals from the system controller 230. The first and second curtains of the focal plane shutter 210 have springs as their drive source, and spring charge is required for the next operation after shutter travel. Accordingly, a shutter charge mechanism 214 performs spring charge. The system controller 230 also stores a program curve that establishes the relation between the amount of exposure obtained from output of a specific photometry region in the photometer 209 or the image sensor 212, and the charge accumulation time of the image sensor 212, the exposure sensitivity, and the aperture value, in a nonvolatile memory (not shown).

A camera DSP 227 executes computation related to autofocus by contrast evaluation method (contrast AF). As will be discussed below, the camera DSP 227 has constituent elements for computing the contrast evaluation value, or deciding the size and position of the region in which contrast evaluation value computation will be performed. The contrast evaluation value here is a value that indicates the focal state of the optical system, including the focus lens 101, in contrast AF.

The camera DSP 227 is connected not only to the system controller 230, but also to a timing generator 219, an A/D converter 217 (via a selector 222), a video memory 221, and a working memory 226.

The image sensor 212 is controlled by output from a driver 218 that controls horizontal drive and vertical drive for each pixel on the basis of signals from the timing generator 219, which decides the overall drive timing. The image sensor 212 subjects a subject image to opto-electrical conversion, and produces and outputs an image signal. The image signal produced by the image sensor 212 is amplified by a CDS/AGC circuit 216, and converted into a digital signal by the A/D converter 217. With the camera 200 in this embodiment, the image capture frame rate of the image sensor 212 can be set by manipulation input from manipulation switches 232. The output according to the set image capture frame rate is controlled by the timing generator 219 so that the image capture frame rate of the image sensor 212 will be the set value. The image capture frame rate may be changed according to a plurality of image capture modes, including a moving picture capture mode that produces image signals for moving pictures, and a still picture capture mode that produces image signals for still pictures.

The output from the A/D converter 217 is inputted to a memory controller 228 via the selector 222, which selects signals on the basis of signals from the system controller 230, and all of this is transferred to a DRAM 229, which is a frame memory.

With a video camera or compact digital camera, when this transfer result is transferred periodically (every frame) to the video memory 221 in an image capture standby state, viewfinder display (live view) or the like is performed by a monitor display 220. On the other hand, with an ordinary single lens reflex camera, the image sensor 212 is blocked off by the quick-return mirror 203 and the focal plane shutter 210 in an image capture standby state, so live view display is impossible.

However, live view will be possible even with a single lens reflex digital camera if the focal plane shutter 210 is opened after first putting the quick-return mirror 203 in its up state and retracting it from the image capture optical path. Also, a contrast evaluation value indicating the focal state of the optical system, including the focus lens 101, can be obtained by processing an image signal from the image sensor 212 with the camera DSP 227 or the system controller 230 during live view. This contrast evaluation value can be used to perform contrast AF.

During image capture, data for each pixel in one frame is read from the DRAM 229 under a control signal from the system controller 230, and after image processing with the camera DSP 227, this data is first stored in the working memory 226. The data in the working memory 226 is then compressed on the basis of a specific compression format by a compression/decompression circuit 225, and this result is stored in an external nonvolatile memory 224. A removable recording medium, such as a semiconductor memory card, is usually used as this nonvolatile memory 224. Also, any nonvolatile recording medium, such as a magnetic disk or an optical disk, can be used as the nonvolatile memory 224.

Further, a display unit 231 connected to the system controller 230 displays the operating state of the camera set or selected with switches included in the manipulation switches 232, by means of a liquid crystal display panel, an LED (light emitting diode), an organic EL display panel, or another such display element.

The manipulation switches 232 are an input device group used by the user to perform manipulation input for the various setting categories of the camera 200. A release switch (SW1) 233 is ON when a release button is pressed halfway down, and the system controller 230 starts image capture preparation operations, such as light metering and focal detection, when the SW1 233 is switched on. A release switch (SW2) 234 is ON when the release button is pressed all the way down, and the system controller 230 starts image capture operation (charge accumulation and charge reading operations for capturing a still picture for recording) when the SW2 234 is switched on. A live view mode switch 235 is used to control the switching of live view display. A moving picture switch 236 is used to start continuous image capture operation (repeated charge accumulation and charge reading operations for obtaining a moving picture).

Meanwhile, with the image capturing lens 100 that serves as the lens unit, a memory 109 is connected to the lens controller 108. At least part of the memory 109 is nonvolatile, and performance information, such as the focal distance of the image capturing lens 100, the open aperture value, and information about the aperture drive speed that can be set, and the lens ID (lens identification information), which is unique information for identifying the image capturing lens 100, are stored. A correction value for correcting the output of the focus detection circuit 206 (discussed below) is also stored in the memory 109. If the camera 200 is an interchangeable lens type, then constituent elements related to the control of the image capturing lens 100 are included in the main body. In this case, the system controller 230 and a nonvolatile memory (not shown) (or an EEPROM 223) may function as the lens controller 108 and the memory 109.

Performance information and lens ID (collectively referred to as lens information) are sent to the system controller 230 in the initial communication carried out between the system controller 230 and the lens controller 108 when the image capturing lens 100 is mounted to the camera 200. The system controller 230 stores the received lens information in the EEPROM 223, for example.

The image capturing lens 100 is also provided with a lens position information detector 110 for detecting information about the position of the focus lens 101. The lens position information detected by the lens position information detector 110 is read by the lens controller 108. Lens position information is used to control the drive of the focus lens 101, and is sent through the electrical contact unit 107 to the system controller 230.

The lens position information detector 110 is, for example, a pulse encoder that detects the number of rotation pulses of the motor that is part of the lens drive mechanism. This output is connected to a hardware counter (not shown) inside the lens controller 108, and when the lens is driven, information about its position is counted by hardware. When the lens position information is read by the lens controller 108, a register of the internal hardware counter is accessed, and the stored counter value is read.

Figure 3:
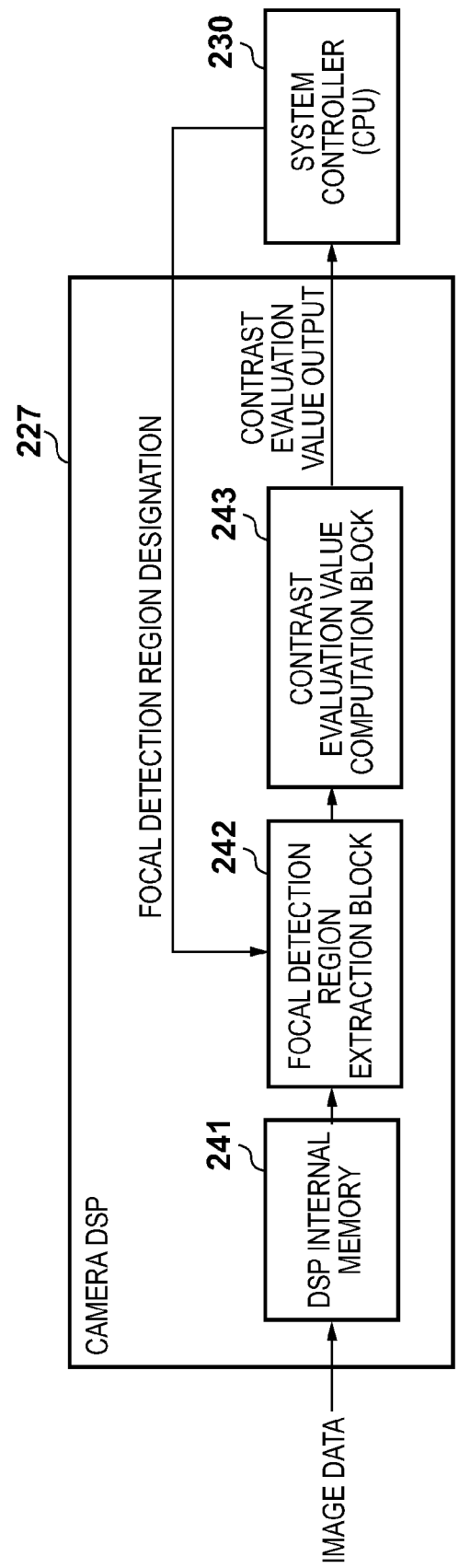
FIG. 3 is a function block diagram of a camera DSP in FIG. 1.

Next, the circuit blocks inside the camera DSP 227 will be described through reference to FIG. 3.

An image signal produced by the image sensor 212 is amplified by the CDS/AGC circuit 216 and converted into digital data by the A/D converter 217, as discussed above. The digitized image data is inputted through the selector 222 to the camera DSP 227.

In order to compute the contrast evaluation value used in contrast AF, the image data inputted to the camera DSP 227 is first inputted through an internal memory 241 inside the camera DSP 227, to a focal detection region extraction block 242. The focal detection region extraction block 242 extracts the image of the focal detection region and its surroundings from image data equivalent to a full screen, and supplies this to a contrast evaluation value computation block 243. The size of the focal detection region can be about one-fifth to one-tenth the size of the full screen. The position and size of the focal detection region within the screen can be set by the system controller 230 with respect to the focal detection region extraction block 242. The contrast evaluation value computation block 243 extracts a specific frequency component by digital filter computation for the focal detection region and its surroundings, and outputs this as a contrast evaluation value to the system controller 230.

Operation to Obtain Phase Difference AF Correction Value

Figure 4:
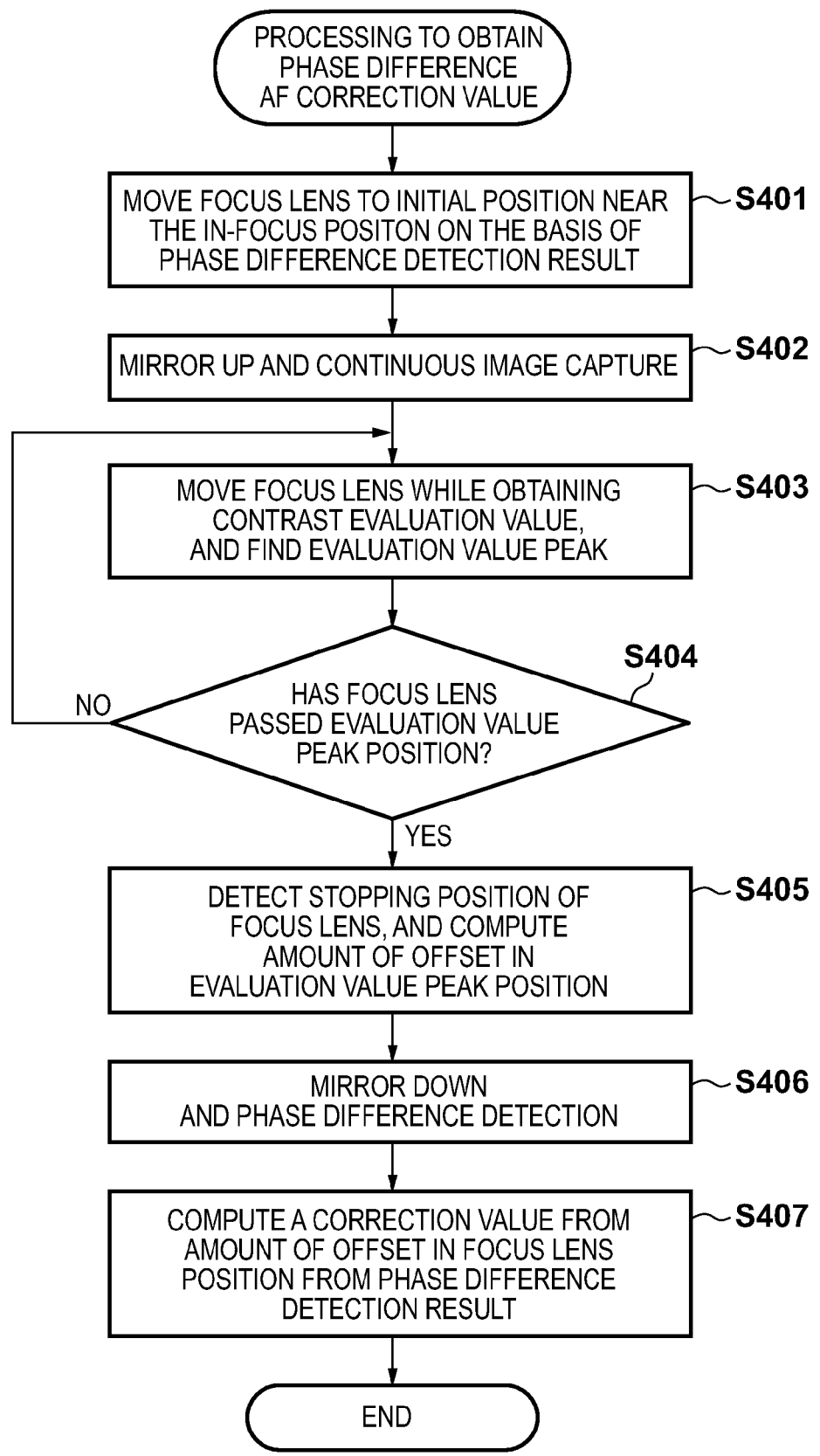
FIG. 4 is a flowchart illustrating the operation of obtaining a phase difference AF correction value with the digital single lens reflex camera according to an embodiment of the present invention.

Next, the operation for obtaining a phase difference AF correction value with the camera 200 of this embodiment will be described through reference to the flowchart in FIG. 4. In the following operation, the subject distance will be assumed to be constant.

The operation to obtain a correction value is started, for example, in response to the detection by the system controller 230 that a command to obtain a correction value has been inputted through the manipulation switches 232. It is assumed that the power has already been switched on to the camera 200.

First, in S401, the system controller 230 executes phase difference (defocus amount) detection using the phase difference AF sensor 205 and the focus detection circuit 206 to bring the focus lens 101 close to an in-focus position. The system controller 230 then moves the focus lens 101 to a position corresponding to a defocus amount that differs by a specific amount from the detected defocus amount (or, to a position that differs by a specific amount from the position corresponding to the detected defocus amount). This makes it possible to start obtaining a contrast evaluation value from close to the peak position of the contrast evaluation value, and shortens the time it takes for peak detection.

Specifically, since the contrast evaluation values before and after the peak position has to be obtained to find the peak position of the contrast evaluation value, the focus lens 101 is moved to a position that is offset from the position corresponding to the detected defocus amount. However, from the standpoint of shortening the peak detection time, the amount can be as small as possible while still allowing the peak to be detected. For instance, this can be an offset amount that corresponds to a distance of about two to three times the computed interval of the contrast evaluation values in contrast evaluation drive. Once the lens controller 108 has sent notification that the movement of the focus lens 101 is complete, the system controller 230 advances the processing to S402.

In S402 the system controller 230 moves the quick-return mirror 203 to a second position (mirror up) outside the image capture optical path, by means of the mirror drive mechanism 213, in order to perform contrast evaluation drive. Also, the focal plane shutter 210 is opened via the shutter controller 215. The system controller 230 then starts continuous image capture operation that is the same as when live view display is performed, for example.

In S403 the system controller 230 uses the position of the focus lens moved in S401 (that is, the position offset slightly from the in-focus lens position detected by phase difference AF) as the initial position, and starts contrast evaluation drive. In phase difference detection, since the offset direction is also detected along with the defocus amount, the direction in which the focus lens is supposed to be moved during contrast evaluation drive is already known. The system controller 230 communicates with the lens controller 108 and directs that the focus lens 101 be moved at a specific speed in one direction (the peak direction). An image capture contrast evaluation value is obtained periodically, for example, by the camera DSP 227 using the capture image data obtained through continuous image capture, and the peak position is found by detecting that the evaluation value has made a transition from increasing to decreasing. In the course of this search, the system controller 230 obtains a contrast evaluation value and also obtains information about the position of the focus lens 101 via the lens controller 108.

In S404 the system controller 230 determines whether or not the position of the focus lens 101 has passed the peak position at which the contrast evaluation value is at its maximum. For example, if it is detected that the contrast evaluation value has made a transition from increasing to decreasing, the system controller 230 can determine that the position of the focus lens 101 has passed the peak position (that the peak has been detected). If it is determined that the position of the focus lens 101 has passed the peak position at which the contrast evaluation value is at its maximum, the system controller 230 moves the processing to S405, and otherwise to S403.

In S405 the system controller 230 stops the drive of the focus lens 101 and obtains through the lens controller 108 the stopping position of the focus lens 101 detected by the lens position information detector 110. The system controller 230 then computes the difference between the focus lens stopping position and the peak position of the contrast evaluation value.

Figure 5:
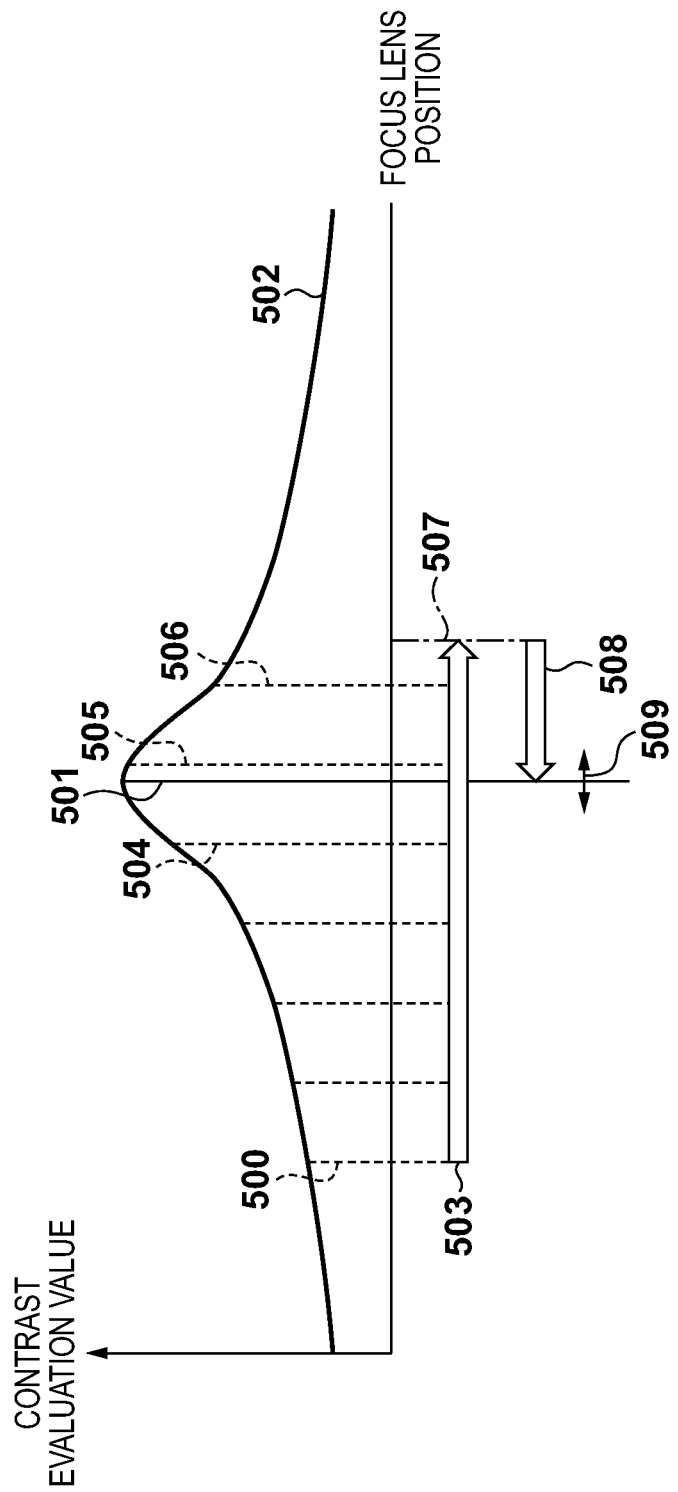
FIG. 5 is a diagram illustrating a conventional operation for obtaining a phase difference AF correction value.

First, the system controller 230 decides the peak position from the relation between the contrast evaluation value during contrast evaluation drive and the position of the focus lens. Any known method in which the focus lens 101 is not driven in reverse in the peak direction can be used as the method for deciding the peak position. For instance, with the example in FIG. 5, the peak position 501 can be found by interpolation or the like from the relation between the contrast evaluation values corresponding to focus lens positions 504 to 506. Alternatively, if the interval at which the contrast evaluation value is obtained during contrast evaluation drive is sufficiently small, the focus lens position at which the obtained contrast evaluation value is at its maximum may be used as the peak position.

Next, the system controller 230 computes the difference between the focus lens stopping position and the peak position. This difference in position is the movement distance from when the focus lens 101 passes the peak position of the contrast evaluation value until the next contrast evaluation value is obtained and peak detection is determined, and the focus lens 101 actually stops under a stop command. That is, this movement distance is the difference between the peak position 501 and the stopping position 507 in FIG. 5, and is the amount of offset from the peak position 501. The system controller 230 then computes the defocus amount corresponding to the different (amount of offset). The system controller 230 then advances the processing to S406, with the focus lens 101 still stopped, in order to minimize the effect of the driving tolerance of the focus lens 101.

In S406 the system controller 230 moves the quick-return mirror 203 to a first position (mirror down) via the mirror drive mechanism 213, so that the light reflected by the submirror 204 is guided to the phase difference AF sensor 205.

Then, in S407 the system controller 230 performs phase difference AF (detection of the defocus amount from the in-focus position) using the phase difference AF sensor 205 and the focus detection circuit 206. As discussed above, the focus lens 101 at this point is still stopped at the stopping position detected in S405 (corresponds to the stopping position 507 in FIG. 5).

Therefore, the system controller 230 computes a correction value by subtracting the defocus amount corresponding to the amount of offset computed in S405 from the defocus amount obtained by the focus detection circuit 206. The system controller 230 sends the computed correction value to the lens controller 108, and the lens controller 108 stores the correction value in the memory 109. The correction value is then used in performing phase difference AF when this image capturing lens 100 is mounted to this camera 200 for image capture. For example, the correction value is applied to the defocus amount detected by the phase difference AF sensor 205 and the focus detection circuit 206 during focus detection in the operation to prepare for capture of a recording image, which is stated when the release switch SW1 233 is switched on. In this case, the ON state of the release switch SW1 233 (when the release switch is pressed halfway down) corresponds to an instruction to start image capture preparation operations.

For instance, when the image capturing lens 100 is mounted to the camera 200, the system controller 230 obtains a correction value and stores it in its own nonvolatile memory, or in the EEPROM 223, the nonvolatile memory 224, or the like. The system controller 230 then applies the correction value to the defocus amount obtained from the focus detection circuit 206, and the corrected defocus amount is given to the lens controller 108. Consequently, the detection result of phase difference AF can be corrected and the focus detection accuracy can be improved. This configuration allows the capacity of the memory 109 to be reduced. Also, since lens type identification information is generally used for exposure amount adjustment or focal point detection, the amount of communication thereof cannot be reduced, but if correction values are stored on the camera side, then the amount of communication between the lens controller 108 and the system controller 230 can be reduced.

Alternatively, the system controller 230 may not correct the defocus amount, and instead the defocus amount received by the system controller 230 from the lens controller 108 may be corrected and the focus lens 101 driven according to the corrected defocus amount.

If correction values that are associated with the lens ID are stored ahead of time in the camera 200, then correction values can be specified from the lens ID obtained when the image capturing lens 100 is mounted without the image capturing lens 100 storing the correction values.

As described above, with this embodiment, when the peak of contrast evaluation values is detected by contrast evaluation drive, the focus lens is stopped and the defocus amount is obtained without moving the focus lens to the peak position. The defocus amount corresponding to the difference between the peak position and the lens stopping position is computed, and this is subtracted from the obtained defocus amount to compute the correction value for the defocus amount. Accordingly, it is possible to minimize the effect that driving tolerance produced when the focus lens is moved to the peak position has on the correction value, so the accuracy of autofocus detection by phase-difference detection method can be improved.

Modification Examples

In the above embodiment, a case was described in which the camera 200 was an interchangeable lens type. However, as mentioned above, the present invention can also be applied to a digital camera with an integrated lens. The present invention can be used effectively in a digital camera with an integrated lens in the setting of correction values performed in the course of adjustment during manufacture, or in correcting the temporal change in the driving tolerance of the lens.

Also, in the above embodiment, regardless of the type of the image capturing lens 100, once the peak of the contrast evaluation value was detected, the contrast evaluation drive was stopped and phase difference detection was performed at the position where the focus lens stopped. However, the focus lens position of phase difference detection may be changed according to the type or characteristics of the image capturing lens.

For example, with a lens having a large driving tolerance, it is conceivable that the effect of driving tolerance will accumulate as drive is performed. As to the type of actuator serving as the drive source for the focus lens, a lens driven by an ultrasonic motor has excellent acceleration and deceleration performance, and there are no gears in many cases, so the driving tolerance is relatively small. In contrast, a lens driven by a DC motor has acceleration and deceleration performance that is inferior to that of an ultrasonic motor, and there are usually gears in the transmission system. If acceleration and deceleration performance is poor, it will be harder to stop at the desired focal position, so there will be a larger driving tolerance. Also, if there are gears in the transmission system, play in the teeth results in larger driving tolerance.

Therefore, when an image capturing lens driven by an ultrasonic motor is mounted, the defocus amount may be detected by driving the focus lens to the peak position after the peak has been detected by contrast evaluation drive. Thus performing the operation allows the focused image to be displayed after the computation of a correction value.

Whether or not the mounted image capturing lens is driven by an ultrasonic motor may be included in the performance information, or an ID for the ultrasonic motor-driven lens may be stored ahead of time in the camera 200, and a determination may be made by comparison to the image capturing lens ID. Also, regardless of whether or not the drive is by ultrasonic motor, lens models recognized as having sufficiently small driving tolerance may be registered ahead of time. Alternatively, the configuration may be such that when the driving tolerance itself is included in the lens information, if an image capturing lens has a driving tolerance below the threshold, the defocus amount is detected by moving the lens to the peak position.

Also, the focus lens position for phase difference detection may be changed according to the size of a so-called focus-sensitivity correction value, which corrects the correspondence of a focus change amount to the physical amount of movement of the lens.

For example, when the focus-sensitivity correction value is large, the focus change amount will be relatively large even though the lens is physically displaced only by a tiny amount in the optical axis direction. Accordingly, the effect of the tolerance of the lens drive system is larger, and focal control suffers. Conversely, when the focus-sensitivity correction value is small, the focus change amount will be relatively small even though the lens is physically displaced only by a tiny amount in the optical axis direction. Accordingly, the effect of the tolerance of the lens drive system is smaller, and focal control is better. The focus-sensitivity correction value is a value that changes with each lens design, and usually varies depending on the focal distance and the focal position.

Therefore, at a focal distance or focal position at which the focus-sensitivity correction value becomes at least a specific value, the focus lens may be moved to the peak position, and the defocus amount detected, after the peak has been detected by contrast evaluation drive. Thus performing the operation allows the focused image to be displayed after computation of the correction value.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-066556, filed on Mar. 24, 2011, which is hereby incorporated by reference herein its entirety.

What is claimed is:

1. A focus detection apparatus, comprising:
focus detection unit which detects a defocus amount of an image capturing lens by phase-difference detection method;
drive control unit which controls drive of a focus lens of the image capturing lens;
evaluation value obtaining unit which obtains a contrast evaluation value of a captured image; and
control unit,
wherein the control unit:
moves the focus lens in one direction, using the drive control unit,
determines whether or not the position of the focus lens has passed a peak position at which the contrast evaluation value is maximum, based on the contrast evaluation values obtained by the evaluation value obtaining unit for captured images captured at different positions of the focus lens,
stops the movement of the focus lens and obtains the focus lens stopping position if it is determined that the position of the focus lens has passed the peak position,
decides the peak position using the contrast evaluation value obtained by the evaluation value obtaining unit and the corresponding position of the focus lens,
detects the defocus amount, using the focus detection unit, without moving the focus lens from the stopping position, and
computes a correction value for the defocus amount detected by the focus detection unit, by subtracting a defocus amount corresponding to a difference between the decided peak position and the stopping position from the defocus amount detected by the focus detection unit.

2. An image capturing apparatus, comprising:
the focus detection apparatus according to claim 1; and
an image sensor for capturing the captured image,
wherein the image capturing lens is interchangeable.

3. The image capturing apparatus according to claim 2, further comprising a storage unit which stores lens identification information for an image capturing lens with a driving tolerance that meets a predetermined condition,
wherein the control unit:
if the identification information for the mounted image capturing lens is stored in the storage unit, decides the peak position the peak position and then detects the defocus amount, using the focus detection unit by moving the focus lens, using the drive control unit from the stopping position to the decided peak position, and computes the correction value for the defocus amount detected by the focus detection unit, by subtracting the defocus amount corresponding to the difference between the decided peak position and the stopping position from the defocus amount detected by moving the focus lens to the peak position.

4. The image capturing apparatus according to claim 2, where the control unit:

detects the defocus amount, using the focus detection unit in response to an instruction to start preparation to capture a recording image, corrects the defocus amount, using the correction value, and moves the focus lens, using the drive control unit, regarding the focus lens position based on the corrected defocus amount as the focal position.

5. The image capturing apparatus according to claim 2, wherein the drive control unit is provided to the image capturing lens.

6. A method for controlling a focus detection apparatus comprising:

focus detection unit which detects a defocus amount of an image capturing lens by phase-difference detection method;

drive control unit which controls drive of a focus lens of the image capturing lens; and evaluation value obtaining unit which obtains a contrast evaluation value of a captured image, the method comprising the steps of:

moving the focus lens in one direction by the drive control unit, determining whether or not the position of the focus lens has passed a peak position at which the contrast evaluation value is maximum, based on the contrast evaluation values obtained by the evaluation value obtaining unit for captured images captured at different positions of the focus lens, stopping the movement of the focus lens and obtaining the focus lens stopping position if it is determined that the position of the focus lens has passed the peak position, deciding the peak position using the contrast evaluation value obtained by the evaluation value obtaining unit and the corresponding position of the focus lens, detecting the defocus amount, by the focus detection unit, without moving the focus lens from the stopping position, and computing a correction value for the defocus amount detected by the focus detection unit, by subtracting a defocus amount corresponding to a difference between the decided peak position and the stopping position from the defocus amount detected by the focus detection unit.

7. A focus detection apparatus, comprising:

focus detection unit which detects a defocus amount of an image capturing lens by phase-difference detection method;

drive control unit which controls drive of a focus lens of the image capturing lens;

evaluation value obtaining unit which obtains a contrast evaluation value of a captured image; and control unit, wherein the control unit:

moves the focus lens in one direction, using the drive control unit, determines whether or not the position of the focus lens has passed a peak position at which the contrast evaluation value is maximum, based on the contrast evaluation values obtained by the evaluation value obtaining unit for captured images captured at different positions of the focus lens, if it is determined that the position of the focus lens has passed the peak position, stops the movement of the focus lens without returning the focus lens to the peak position and obtains the focus lens stopping position, decides the peak position using the contrast evaluation value obtained by the evaluation value obtaining unit and the corresponding position of the focus lens, detects the defocus amount, using the focus detection unit, without moving the focus lens from the stopping position, and computes a correction value for the defocus amount detected by the focus detection unit, by subtracting a defocus amount corresponding to a difference between the decided peak position and the stopping position from the defocus amount detected by the focus detection unit.

8. An image capturing apparatus, comprising:

the focus detection apparatus according to claim 7; and an image sensor for capturing the captured image, wherein the image capturing lens is interchangeable.

9. The image capturing apparatus according to claim 8, further comprising a storage unit which stores lens identification information for an image capturing lens with a driving tolerance that meets a predetermined condition, wherein the control unit:

if the identification information for the mounted image capturing lens is stored in the storage unit, decides the peak position the peak position and then detects the defocus amount, using the focus detection unit by moving the focus lens, using the drive control unit from the stopping position to the decided peak position, and computes the correction value for the defocus amount detected by the focus detection unit, by subtracting the defocus amount corresponding to the difference between the decided peak position and the stopping position from the defocus amount detected by moving the focus lens to the peak position.

10. The image capturing apparatus according to claim 8, where the control unit:

detects the defocus amount, using the focus detection unit in response to an instruction to start preparation to capture a recording image, corrects the defocus amount, using the correction value, and moves the focus lens, using the drive control unit, regarding the focus lens position based on the corrected defocus amount as the focal position.

11. The image capturing apparatus according to claim 8, wherein the drive control unit is provided to the image capturing lens.

12. A method for controlling a focus detection apparatus comprising:

focus detection unit which detects a defocus amount of an image capturing lens by phase-difference detection method;

drive control unit which controls drive of a focus lens of the image capturing lens; and evaluation value obtaining unit which obtains a contrast evaluation value of a captured image, the method comprising the steps of:

moving the focus lens in one direction by the drive control unit, determining whether or not the position of the focus lens has passed a peak position at which the contrast evaluation value is maximum, based on the contrast evaluation values obtained by the evaluation value obtaining unit for captured images captured at different positions of the focus lens, stopping, if it is determined that the position of the focus lens has passed the peak position, the movement of the focus lens without returning the focus lens to the peak position and obtaining the focus lens stopping position, deciding the peak position using the contrast evaluation value obtained by the evaluation value obtaining unit and the corresponding position of the focus lens, detecting the defocus amount, by the focus detection unit, without moving the focus lens from the stopping position, and computing a correction value for the defocus amount detected by the focus detection unit, by subtracting a defocus amount corresponding to a difference between the decided peak position and the stopping position from the defocus amount detected by the focus detection unit.

* * * * *